US012757024B2

(12) United States Patent
Lim et al.

(10) Patent No.: US 12,757,024 B2
(45) Date of Patent: Oct. 6, 2026

(54) METHOD FOR PERSONALIZING A SECURE ELEMENT

(71) Applicant: GIESECKE+DEVRIENT MOBILE SECURITY GERMANY GMBH, Munich (DE)

(72) Inventors: BeeGek Lim, Haar (DE); Martin Rosner, Haag (DE)

(73) Assignee: GIESECKE+DEVRIENT MOBILE SECURITY GERMANY GMBH, Munich (DE)

( * ) Notice: Subject to any disclaimer, the term of this patent is extended or adjusted under 35 U.S.C. 154(b) by 44 days.

(21) Appl. No.: 18/554,084

(22) PCT Filed: Apr. 5, 2022

(86) PCT No.: PCT/EP2022/025131
§ 371 (c)(1),
(2) Date: Oct. 5, 2023

(87) PCT Pub. No.: WO2022/214219
PCT Pub. Date: Oct. 13, 2022

(65) Prior Publication Data

US 2024/0129743 A1 Apr. 18, 2024

(30) Foreign Application Priority Data

Apr. 9, 2021 (DE) ..................... 10 2021 001 850.8

(51) Int. Cl.
*H04W 12/30* (2021.01)
*H04W 12/04* (2021.01)
*H04W 24/06* (2009.01)

(52) U.S. Cl.
CPC .......... *H04W 12/35* (2021.01); *H04W 12/04* (2013.01); *H04W 24/06* (2013.01)

(58) Field of Classification Search
CPC ..... G06F 21/57; H04L 9/0827; H04L 9/0841; H04L 9/0877; H04W 12/04; H04W 12/35;
(Continued)

(56) References Cited

U.S. PATENT DOCUMENTS 8,909,144 B2 * 12/2014 Huomo .................. G06F 21/78 455/41.1
8,996,002 B2 * 3/2015 Rodgers ................. H04W 8/08 455/406
(Continued)

FOREIGN PATENT DOCUMENTS

DE 102014014561 A1 3/2016
DE 102015119800 A1 5/2017
(Continued)

OTHER PUBLICATIONS

GSM Association: "SGP.02 Remote Provisioning Architecture for Embedded UICC Technical Specification, Version 4.2", Jul. 7, 2020, 452 pages.
(Continued)

*Primary Examiner* — Sharon S Lynch
(74) *Attorney, Agent, or Firm* — Workman Nydegger

(57) ABSTRACT

A method for personalizing a secure element, had the following steps: receiving, in a data generator, a request for a bundle of storage images for a plurality of secure elements; obtaining, in the data generator, at least one subscription data set for at least one securing element to be personalized of the plurality of secure elements; providing an operating system or a part of the operating system for the secure element to be personalized; generating, by means of the data generator, a storage image for each of the secure elements according to the received request; and bundling the generated storage image and providing the bundled storage image in the form of a storage image bundle by means of the data
(Continued)

generator in order to complete the terminal, thereby introducing at least the storage image of the secure element to be personalized into the secure element.

16 Claims, 7 Drawing Sheets

(58) Field of Classification Search
CPC ..... H04W 12/40; H04W 24/06; H04W 8/183; H04W 8/205
See application file for complete search history.

(56) References Cited

U.S. PATENT DOCUMENTS

| | | | | |
|---|---|---|---|---|
| 9,439,062 | B2 * | 9/2016 | Li | H04W 12/45 |
| 9,521,543 | B2 * | 12/2016 | Weiss | H04W 12/06 |
| 9,705,546 | B2 * | 7/2017 | Lee | H04W 12/40 |
| 9,794,775 | B2 * | 10/2017 | Huber | H04W 8/265 |
| 10,108,409 | B2 * | 10/2018 | Pirzadeh | G06F 21/53 |
| 10,277,587 | B2 * | 4/2019 | Li | H04L 63/061 |
| 10,277,734 | B2 * | 4/2019 | Hentschel | H04B 7/02 |
| 10,331,435 | B2 * | 6/2019 | Pirzadeh | G06F 8/65 |
| 10,397,781 | B2 * | 8/2019 | Wimböck | H04W 12/06 |
| 10,492,075 | B2 * | 11/2019 | Daksiewicz | H04W 48/18 |
| 10,631,214 | B2 * | 4/2020 | Huber | H04L 67/306 |
| 10,776,101 | B2 * | 9/2020 | Pirzadeh | G06F 8/65 |
| 11,146,948 | B1 * | 10/2021 | Uehling | H04W 12/30 |
| 11,379,543 | B2 * | 7/2022 | Gallenbacher | G06F 16/9535 |
| 11,444,759 | B2 * | 9/2022 | Pilozzi | H04L 9/30 |
| 11,675,001 | B2 * | 6/2023 | Alfarano | G01R 31/3183<br>324/762.01 |
| 11,678,176 | B1 * | 6/2023 | Uehling | H04W 12/43<br>370/329 |
| 11,698,994 | B2 * | 7/2023 | Götze | H04W 4/50<br>713/2 |
| 11,991,276 | B2 * | 5/2024 | Pilozzi | H04L 9/14 |
| 12,353,487 | B2 * | 7/2025 | Gallenbacher | G06F 16/9535 |
| 2009/0236414 | A1 * | 9/2009 | Finkenzeller | G06Q 20/341<br>414/222.01 |
| 2013/0227646 | A1 * | 8/2013 | Haggerty | H04L 63/10<br>726/3 |
| 2013/0344807 | A1 * | 12/2013 | Huomo | G06Q 20/045<br>455/41.1 |
| 2014/0349617 | A1 * | 11/2014 | Li | H04W 8/20<br>455/418 |
| 2015/0193222 | A1 * | 7/2015 | Pirzadeh | G06F 8/65<br>717/168 |
| 2015/0350881 | A1 * | 12/2015 | Weiss | H04W 12/04<br>455/558 |
| 2016/0020802 | A1 * | 1/2016 | Lee | H04W 8/18<br>455/558 |
| 2016/0192179 | A1 * | 6/2016 | Huber | H04W 8/265<br>455/411 |
| 2016/0198378 | A1 * | 7/2016 | Huber | H04W 8/265<br>370/331 |
| 2016/0249203 | A1 * | 8/2016 | Mazali | H04W 8/183 |
| 2016/0316372 | A1 * | 10/2016 | Daksiewicz | H04L 67/306 |
| 2017/0104750 | A1 * | 4/2017 | Li | H04W 12/35 |
| 2017/0230830 | A1 * | 8/2017 | Wimböck | H04W 12/35 |
| 2017/0351771 | A1 * | 12/2017 | Gallenbacher | G06F 16/9535 |
| 2018/0054517 | A1 * | 2/2018 | Hentschel | H04W 4/60 |
| 2018/0139612 | A1 * | 5/2018 | Rhelimi | H04W 12/08 |
| 2019/0004786 | A1 * | 1/2019 | Pirzadeh | G06F 21/57 |
| 2019/0037405 | A1 * | 1/2019 | Daksiewicz | H04W 12/08 |
| 2019/0090129 | A1 * | 3/2019 | Yang | H04W 12/42 |
| 2019/0147193 | A1 * | 5/2019 | Götze | G06F 9/445<br>713/2 |
| 2019/0258475 | A1 * | 8/2019 | Pirzadeh | G06F 21/53 |
| 2019/0306697 | A1 * | 10/2019 | Veneroso | H04W 4/50 |
| 2019/0386822 | A1 * | 12/2019 | Ben-Simon | H04L 9/3247 |
| 2020/0382294 | A1 * | 12/2020 | Pilozzi | H04L 9/0897 |
| 2021/0096178 | A1 * | 4/2021 | Alfarano | G11C 16/14 |
| 2022/0327176 | A1 * | 10/2022 | Gallenbacher | G06F 16/9535 |
| 2023/0006823 | A1 * | 1/2023 | Pilozzi | H04L 9/3226 |
| 2023/0171100 | A1 * | 6/2023 | Eckardt | H04W 12/40<br>713/171 |
| 2024/0056821 | A1 * | 2/2024 | Vilmos | H04W 12/48 |

FOREIGN PATENT DOCUMENTS

| | | | |
|---|---|---|---|
| DE | 112016004598 | T5 | 6/2018 |
| DE | 102020003275 | B3 | 6/2021 |
| EP | 2975872 | A1 | 1/2016 |

OTHER PUBLICATIONS

International Search Report from corresponding PCT Application No. PCT/EP2022/025131, Jul. 15, 2022.

German Search Report from corresponding DE Application No. 102021001850.8, Feb. 15, 2022.

* cited by examiner

METHOD FOR PERSONALIZING A SECURE ELEMENT

TECHNICAL FIELD OF THE INVENTION

The invention relates to a method for personalizing a secure element. The secure element is fixedly installed in a mobile terminal.

In order to use services, the terminal, for example a mobile telephone (such as a smart phone) or laptop/tablet or a machine-to-machine device, M2M device for short, or a device for using Internet-of-things, IoT for short, technologies, contains a secure element, also referred to below as "SE" for short.

In order to use a terminal in a communications network of a network operator (=MNO), the SE of the terminal comprises at least one subscription data set (profile or profile data for short). The profile achieves the configuration of the terminal and the link of the terminal in and to the communications network, for example a mobile radio network. For this purpose, data (user data, profile data, personalization data) are stored in the SE as a subscription data set in order to uniquely identify and/or authenticate a user (=person, subscriber or device) for the use of a service of the communications network or on a communications network. This identification/authentication is also referred to as SIM functionality.

Therefore, it is possible for an operator of the service or the network operator of the communications network to uniquely assign the use of its offered service to each user. Furthermore, it is possible for the operator of a communications network to enable a network access, i.e. the registration into the communications network, as soon as an authentication of the user has taken place. The operator can in addition deny network access if an authentication of the user is not possible.

TECHNICAL BACKGROUND

In particular, the trustworthiness, the protection of security-relevant user data and the prevention of the existence, in the foreseeable future, of terminals with unused user data which are not to be distributed firstly make it necessary firstly that a terminal manufacturer first obtains a non-personalized SE from an SE manufacturer and secondly require that the terminal manufacturer cannot personalize the SE themselves. In order to personalize the SE, for example to store an operating system on the SE and to introduce a profile, the SE needs to be installed in the terminal in such a way as to be operationally ready.

The production chain for fixedly installing an SE, such as an iSE or an eSE, in a terminal typically provides that first a chipset with an iSE is produced. The chipset manufacturer then provides the chipset equipped with the SE to a terminal manufacturer. The terminal manufacturer installs the chipset with the SE in the terminal.

Only at a time close to the beginning of the life cycle of the SE is the SE personalized, wherein, in a first step, an operating system is programmed into the SE in order to make the SE usable. After successful introduction of the operating system into the SE, in a subsequent second step a profile is loaded into the SE. The loading can take place at the terminal manufacturer's end by means of a contact interface or "in the field" via an air interface (OTA).

In any case, only after the introduction of a fixedly installed SE, such as an iSE or an eSE, into the terminal is loading of the operating system and then introduction of a profile provided or possible at all. This complicates the production process of the terminals at the terminal manufacturer's end and lengthens the delivery time of terminals and is therefore undesirable from the point of view of the terminal manufacturer and possibly also from the user's point of view.

For terminal manufacturers it would be desirable if the SE delivered by the SE manufacturer were to be completely in a terminal manufacturer's control already prior to personalization. Then, the terminal manufacturer would not be dependent on an approval from the SE manufacturer in order to personalize the SE with operating system and profile in order to be able to finish the terminal. For the terminal manufacturer, finishing processes for terminals would then be independent of the SE manufacturer or network operator.

If an SE manufacturer were to readily transfer the operating system and profile data to the terminal manufacturer prior to installation of the SE in the terminal, however, or approve the SE correspondingly for personalization by the terminal manufacturer, the operating system and profile data would be completely outside the sphere of influence of the SE manufacturer or the network operator. The terminal manufacturer could use the operating system and the profile data largely as desired, even for uses which neither the SE manufacturer nor the network operator and possibly also the user himself or herself would condone.

In the German patent application DE 102020003275.3 by the same Applicant, this problem is solved by virtue of a hardware security module, HSM for short, being introduced as a secure instance in the personalization process. The SE and the HSM in this case negotiate cryptographic keys for each SE. An encrypted operating system packet consisting of an operating system and profile data for a specific SE is stored together with a public HSM key as a so-called "BLOB" in the HSM and then provided to the terminal manufacturer individually at the terminal manufacturer's individual request. Therefore, a secure exchange of operating system and profile data per SE is ensured during the finishing of the terminals. The terminal manufacturer does not have a view into the operating system or the profile data of the respective SE, with the result that the control for the SE continues to be with the SE manufacturer or the HSM alone.

DE 112016004598 T5 discloses a proposal for instantiating a plurality of eSIMs on an eUICC. In this case, a hardware manufacturer for an eUICC makes available an eSIM packet which comprises at least two BLOBs ("binary large objects"), of which one contains a data set having common data which are identical for a number of eSIMs and the other a data set with unique personalization data for an eSIM. By virtue of a plurality of BLOBs with data sets of the second type being introduced, it is possible for a plurality of eSIMs to be instantiated on one eUICC.

Both the terminal manufacturer and the SE manufacturer have an interest in further optimizing this personalization process. In this case, in particular a multiplicity of SEs should be capable of being personalized "en bloc" for corresponding terminals (batch of terminals) at a terminal manufacturer's end—at a time desired by the terminal manufacturer.

In addition, profile data for an SE can be made available prior to the introduction of an operating system into the SE in order to prevent further production delays owing to the previously two-stage process (first loading the operating system and then obtaining profile data).

SUMMARY OF THE INVENTION

The invention is based on the object of providing a method for personalizing SEs in which the above-described problems are solved.

In accordance with the invention, a method for personalizing a secure element having the following method steps is provided: receiving, in a data generator, a request for a bundle of memory maps for a multiplicity of secure elements, wherein each requested memory map of the received bundle relates to a secure element of the multiplicity of secure elements, and wherein in each case one secure element of the multiplicity of secure elements is being or is fixedly installed in a corresponding terminal of a multiplicity of terminals; obtaining, in the data generator, at least one subscription data set for at least one secure element to be personalized of the multiplicity of secure elements, wherein the subscription data set is obtained from a subscription management server; providing, by means of the data generator, an operating system or part of the operating system for the secure element to be personalized; generating, by means of the data generator, a memory map for each of the secure elements in accordance with the received request, wherein the memory map of the secure element to be personalized comprises the provided operating system or the part of the operating system and additionally the obtained at least one subscription data set; and bundling the generated memory maps and providing the bundled memory maps as a memory map bundle by means of the data generator for finishing the terminals whilst introducing at least the memory map of the secure element to be personalized into the secure element for personalizing the secure element.

In this case, the term personalizing is intended to mean the introduction of an operating system or at least one operating system part and also the introduction of a subscription data set into an SE. A personalized SE is configured to identify/authenticate the user of a terminal in which the SE is fixedly installed on a communications network in order to be able to use the services of the communications network. The personalization comprises the steps of configuring the SE, i.e. storing and installing an operating system in the SE and also initializing the SE with user data (profile data, possibly also referred to as subscription data set). The personalization also comprises the pre-personalization or the introduction of an initial profile, with which an initial registration (initial authentication) of the SE after the initial startup of the terminal at a network operator's end is not denied on grounds of being invalid and possibly forwarding to a subscription manager takes place.

A data generator is an instance which is different than a terminal manufacturer and also than a subscription data manager in the personalization process. The data generator is in one configuration arranged physically separately (i.e. externally) from the terminal manufacturer and/or the subscription data manager. The data generator can be an SE manufacturer, i.e. an instance which provides an SE functionality, in particular a SIM functionality for introduction into an SE. In addition, the data generator is an instance which, irrespective of an operating system of the SE, can obtain profile data from a subscription data manager server. The data generator can also be referred to as SIM manufacturer or vSIM manufacturer and is primarily intended for generating memory maps for SEs. A memory map for an SE comprises an operating system for the SE and a subscription data set (profile data). By configuring the memory map in the SE at the terminal manufacturer's end, the SE obtains a SIM functionality.

The data generator obtains a request for a bundle of memory maps for a multiplicity of SEs. In this case, the bundle corresponds to an indication of a combination of individual requests relating to a multiplicity of SEs. The bundle is a data set with which a respective memory map (bundled) is requested for a multiplicity of SEs. In a simple case, the received request (only) contains the indication of a number of memory maps which is intended to be provided by the data generator.

In a more complex case, the received request contains corresponding individual requests. Thus, the request can also contain indications of a range of unique SE identifications (such as SE identifiers). For example, the request can be an SE identification as start identification and in addition an indication of the number of requested memory maps. For example, the request can comprise a first SE identification as start identification and a second SE identification as stop identification. In these cases, it is assumed that all of the requested memory maps are provided for a multiplicity of SEs whose SE identifications have a successive range of identification numbers.

In another more complex case, the received request contains corresponding individual requests. The individual demands in the request are concatenated, attached to one another (for example as tag length value (TLV) data set) or linked in another way to form a bundle. In the data generator, all of the individual requests are thus obtained at once en bloc.

Preferably, the request for the bundle is sent by a terminal manufacturer or a chipset manufacturer and received directly in the data generator. The terminal manufacturer or the chipset manufacturer issues this request for the bundle possibly as part of a production process for a multiplicity of terminals in which in each case at least one SE is intended to be fixedly installed.

The term "SE" is used synonymously in this description with the terms "universal integrated circuit card (=UICC)", "embedded UICC (=eUICC)", "integrated UICC (=iUICC) ", "integrated secure element (=iSE)", "embedded secure element (=eSE)", "chip card", "smart card", "subscriber identity module (=SIM)", "embedded SIM (=eSIM)", "integrated SIM (=iSIM)" or "virtual SIM (=vSIM)".

An SE within the meaning of the invention is an electronic module which is reduced in terms of physical size and scope of resources, and which has a control unit (microcontroller) and at least one interface (data interface) for communicating with the device. This communication preferably takes place over a connection protocol, in particular a protocol in accordance with the standard ETSI TS 102 221 or ISO-7816. In the case of UICC designs integrated in system on chip, SoC for short, such as, for example the "iUICC", "iSE" or the "iTRE", the communication takes place over an SoC-internal bus. The SE has an internal or external secure nonvolatile memory area in which user data are securely introduced in order to prevent manipulation and/or misuse attempts in the identification and/or authentication on the network. The SE has a memory area in which internal states of an SE session can be stored.

The SE serves the purpose of identifying a user in a communications network using the machine-readable user data stored in the secure nonvolatile memory area and authenticating said user for the use of services (=SIM functionality).

Therefore, USIM, TSIM, ISIM, CSIM or R-UIM also fall under this SE. Thus, an SE is defined, for example, as a USIM application in ETSI TS 131 102. Thus, an SE is defined, for example, as a SIM application in ETSI TS 151

011. Thus, an SE is defined, for example, as a TSIM application in accordance with ETSI TS 100 812. Thus, an SE is defined, for example, as an ISIM application in accordance with ETSI TS 131 103. Thus, an SE is defined, for example, as a CSIM application in accordance with 3GPP2 C.S0065-B. Thus, an SE is defined, for example, as an R-UIM application in accordance with 3GPP2 C. S0023-D.

The SEs according to the invention can be configured in different form factors, in particular embedded, integrated or as software SE alone.

The SE is fixedly installed in a terminal.

For example, the SE is an installed (integral, embedded) part within the terminal, for example a permanently wired electronic module (=chip, circuit). Such embedded SEs, such as eSEs or eUICCs, cannot be removed easily from the terminal and are in principle not easily replaceable. Such eSEs are a secure hardware component in the terminal. The eSE is arranged on a decided, dedicated housed chip or SoC and fixedly installed in a terminal (for example soldered in), but is otherwise constructed similarly to the previously customary plug-in SE. As standard, an embedded SE has a dedicated internal nonvolatile memory (NVM) in which operating system, personalization data, subscription profiles and applications are stored.

The SE can also be a software component in a trustworthy part of an operating system, a so-called trusted execution environment, TEE for short, of the device. The SE is, for example, within a secure runtime environment, in the form of programs running therein, so-called "trustlets".

For example, the SE is a fully integrated module in a terminal chip or an SoC of the chipset of the terminal. In contrast to embedded SEs, these SEs are not provided on a dedicated chip, separated chip. These SEs are referred to as "iUICCs", "iTREs" or "iSEs". For this purpose, the terminal itself comprises a chipset, which comprises one or more terminal chips for operating functions of the terminal. Smartphones typically have, for example, a chipset having at least three terminal chips, namely a transceiver IC, which performs the physical radio communication, a baseband processor (or synonymously modem), which performs functions for data transmission over radio communication on a protocol level, and an application processor AP, on which the operating system and application software are executed. As further terminal chips, transceiver ICs for other radio channels can be provided, in particular for short-range radio channels such as NFC (NFC: near field communication) or Bluetooth modules. The communication within the chipset, between the chips of the chipset, takes place, for example, over a bus.

An iSE has, within an area on the chipset that is assigned to the iSE, an internal secure processor and an internal random-access memory, but barely any internal nonvolatile memory NVM which could be used for secure permanent storage of operating system with subscription data set and/or profile data. Therefore, for iSEs the approach is followed of storing the operating system and the subscription data set in encrypted form in an external nonvolatile memory NVM provided outside the iSE but still in the (same) chipset of the terminal. Only the iSE can decrypt the operating system stored in encrypted form in the external nonvolatile memory NVM of the chipset and the subscription data set and execute them exclusively within the iSE, for example by means of a secure processor, in the internal random-access memory of the iSE. The terminal, on the other hand, cannot decrypt the operating system and the profile data or the subscription data set and cannot execute them.

This use of external nonvolatile memories NVM of the terminal for operating system and subscription data set can be envisaged to an equivalent extent for eSEs as well.

Instead of the use of an NVM in the (same) chipset of the terminal, the terminal manufacturer can also install a (different) NVM in the terminal. The NVM can be determined exclusively for the SE(s) of the terminal.

The chipset including an SE located therein can be provided as a single system-on-chip which can be soldered into a terminal as a monolithic component.

In one configuration, an SE manufacturer produces an SE hardware unit and provides this unit to a chipset manufacturer. The chipset manufacturer integrates this SE hardware unit into a chipset for a terminal, for example by soldering the SE hardware unit onto a printed circuit board to which further elements of the chipset are also soldered. Finally, the chipset is fixedly installed, for example soldered, in the terminal.

None of the multiplicity of SEs has been personalized at the time at which the request for the bundle is received. None of the multiplicity of SEs can be personalized or configured by the terminal manufacturer. In one configuration, the SE has not (yet) been fixedly installed in the respective terminal at the time at which the request for the bundle is received.

The term "terminal" is preferably used here since the terminal in communications technology can primarily be a "terminal". This does not rule out the possibility of the "terminal" being a "device" in a different technology. The terms "terminal" and "device" are in this case used synonymously.

The SE can be used for remote monitoring, checking and maintenance of devices such as machines, equipment and systems. It can be used for meters such as electricity meters, hot water meters, etc. The SE is, for example, part of the IoT technology.

Each terminal can have at least one SE; it is also possible for a plurality of SEs to be fixedly installed in a terminal (embedded SE, integrated SE, SE as software).

A terminal within the meaning of the invention is in principle a terminal or a terminal component having means for communicating with a communications network in order to be able to use services of the communications network or in order to be able to use services of a server via a gateway of the communications network. For example, a mobile terminal such as a smartphone, a tablet PC, a notebook etc. should be included under the term. The terminal can also be understood to mean, for example, multimedia terminals such as digital picture frames, audio devices, televisions, e-book readers, a smartwatch, digital spectacles which have means for communicating with the communications network.

For example, the terminal is installed in a machine, an automatic machine and/or a vehicle. If the terminal is installed in a motor vehicle, it has, for example, an iSE or eSE or an SE as software. The SE can set up a data link to a server via the communications network by means of the terminal, for example a modem of the terminal (preferably on the same chipset as the SE). The terminal can be used, for example, to contact a server of the terminal manufacturer in order to access control units, for example ECUs (ECU=electronic control unit) for functionalities of the terminal. Via the SE, a server in the back-office system of the mobile radio network operator, MNO, can be contacted, for example a server in order to load updates for software, firmware and/or operating system of the SE onto the SE.

A subscription data set is also referred to as a subscriber identity data set, profile, profile data, profile data set, user data. The subscription data set consists of a common data structure, for example a file and/or object structure, and personalization data. The common data structure is in this case identical for a bundle of SEs. It fixes in particular the structure of the file or the files in which the personalization data are stored. The personalization data contains data which identify a user (=a person, a subscriber or a device) uniquely in the communications network. This includes, for example, a subscriber identity, also referred to as international mobile subscriber identity, or IMSI for short and/or subscriber-specific data. In addition, personalization data contain data which uniquely authenticate a subscriber on the communications network, for example an authentication algorithm, specific algorithm parameters, a cryptographic authentication key Ki and/or a cryptographic over-the-air, OTA for short, key. In addition, personalization data contains, for example, data which uniquely authenticate a subscriber to a service, for example a unique identification or signature. A service is in particular a voice service or a data service of a server by means of which items of information and/or data are transmitted over the communications network. The subscription data set is stored, for example, in the nonvolatile memory area of the SE.

Any personalization data of the SE and applications of the SE are also added to a subscription data set, for simplicity reasons. In addition, a subscription data set can contain, for example, also personal data. In addition, a subscription data set can also contain, for example, a secret such as a PIN or PUK with which a user authenticates themselves at the SE.

An SE can have only one subscription data set (profile) or else a plurality of subscription data sets (profiles) and can be personalized thereby.

A subscription data set (profile) is, for example, only an initial profile with which an SE sets up a communications link to any desired communications network (and is not rejected by the network). The communications network identifies the initial profile and passes on the data communication of the SE to a subscription manager. The subscription manager then loads a complete profile for the user via an air interface (OTA) onto the SE.

In the data generator, at least one subscription data set (=profile) is obtained by a subscription data manager server. This server accordingly already provides profiles without the SE being equipped with an operating system. This approach corresponds to the approach from the German patent application DE 102020003275.3 by the same Applicant. The server is preferably an (external) instance which is arranged physically removed from the terminal manufacturer and the data generator. The server can be part of the communications network. Alternatively or in addition, the server is not an instance of the communications network. The server is preferably a server configured for remote management of the SEs, for example a so-called provisioning server, for loading profiles or updates for software, firmware or/and operating system of the SE onto the SE. The server is preferably an SM-DP or SM-DP+ in accordance with the GSMA Standard SGP.02.

The data generator additionally provides an operating system or at least one operating system part. The operating system is, for example, a native operating system. It is also conceivable for the operating system to be configured to operate a Java Card runtime environment, JCRE, which is then to be stored, together with the operating system, in the SE. As part of the operating system, it is conceivable for security-uncritical parts of the operating system to already be preinstalled on the SE which are insufficient, however, for making the SE operationally ready. The part of the operating system which is provided in the data generator is then configured to make the SE operationally ready.

The provided operating system relates primarily to static data which remains unchanged in the life cycle of the SE. The subscription data set obtained relates primarily to dynamic data which can be changed/updated/removed/overwritten in the life cycle of the SE.

The data generator generates a memory map for each of the multiplicity of SEs in accordance with the received request. In this case, at least the memory map of the SE to be personalized comprises the provided operating system (or the part of the operating system) and the obtained subscription data set. The memory map (also memory image) is the content copy of the contents for the SE. The memory map is stored as a file. Such a memory map is also referred to as a binary large object, BLOB for short.

Preferably, each of the generated memory maps is cryptographically (SE-individually) encrypted.

Preferably, each of the memory maps is stored, together with a checksum, for example a message authentication code, MAC, in a database.

The generated memory maps are preferably stored as BLOB s in a database of the data generator.

The method also comprises the bundling step in which all of the generated memory maps are bundled, linked, concatenated, combined in accordance with the received request.

Finally, the memory map bundle is provided for finishing the terminals whilst introducing at least the memory map of the secure element to be personalized into the secure element for personalizing the secure element by means of the data generator.

In a preferred configuration, the request for the bundle of memory maps comprises, for each requested memory map, an item of terminal information relating to a terminal in which a secure element relating to the requested memory map is being or is fixedly installed. As the item of terminal information, for example, an identification, for example an identifier of the terminal, is provided. This may be, for example, a chip ID, a chipset ID or a device ID or the like. Thereby, properties of the respective terminal can be identified on the basis of the item of terminal information by the data generator and possibly a selection of the operating system or the profile can be made in terminal-individual fashion. Alternatively, this item of terminal information is used only for logging in the terminal manufacturer or the data generator.

In a preferred configuration, the request for the bundle of memory maps comprises, for each requested memory map, an item of secure element information relating to one of the multiplicity of secure elements relating to one of the requested memory maps. An identification, such as an identifier of the chipset for an SE, is provided, for example, as the item of secure information. This can be, for example, a chip ID or chipset ID or the like. Thus, properties of the respective chipset can be identified on the basis of the item of secure element information by the data generator and possibly a selection of the operating system or the profile can be made in chipset-dependent fashion.

Preferably, the item of terminal information and/or the item of secure element information comprises an item of chipset information for a chipset which comprises the secure element, preferably an identifier of the chipset, in particular an SE UID.

In a preferred configuration, the request for the bundle of memory maps comprises, for each requested memory map, an item of user information relating to a user of a terminal in which an SE relating to one of the requested memory maps is being fixedly installed. An identification, such as identifier of the user, is provided, for example, as the item of user information. This may be, for example, a user ID or the like. Thus, user preferences (language settings, data tariffs, voice tariffs, etc.) can possibly be identified on the basis of the item of user information by the data generator and possibly a selection of the operating system or the profile can be made in user-dependent fashion.

In a preferred configuration, the request for the bundle of memory maps comprises, for each requested memory map, a public key part of a cryptographic key pair of the SE relating to one of the requested memory maps.

Preferably, therefore, the obtained subscription data set is based on the item of terminal information, the item of secure element information and/or the item of user information in order to configure the memory map in terminal-dependent, chipset-dependent and/or user-dependent fashion.

Preferably, the subscription data set is first obtained at the explicit request of the data generator at the subscription data management server. Thus, the data are only generated when they are actually requested, and the security of personal data is therefore increased.

Preferably, the data generator obtains, in the step for obtaining, at least one subscription data set for at least two or more, preferably for all of the secure elements of the multiplicity of secure elements from the subscription management server. The method therefore provides that possibly even more than only one data set request of the bundle is processed completely in the data generator by virtue of subscription data sets being obtained for two or more or even all of the SEs of the multiplicity of SEs. It is conceivable that, per SE, more than one subscription data set is obtained and then more than one subscription data set becomes part of the corresponding memory map of the respective SE.

Preferably, in the providing step, an operating system or part of the operating system is provided for at least two or more, preferably for all of the secure elements of the multiplicity of secure elements. The method therefore provides that possibly even more than only one data set request of the bundle is processed completely in the data generator by virtue of operating system or parts thereof being provided for two or more or even all of the SEs of the multiplicity of SEs and then becoming part of the memory map.

Preferably, the memory map bundle is provided in a database—preferably of the data generator itself—and called up by a terminal manufacturer for finishing the multiplicity of terminals, wherein the callup from the database can take place in cryptographically secure fashion.

According to the invention, a memory map is not called up individually for each SE and provided individually by the data generator, but a bundle is requested and a memory map bundle is provided. This can then be further processed directly in large volumes (en bloc) in the terminal manufacturer or chipset manufacturer.

In a preferred configuration, the memory map of the secure element to be personalized, preferably of two or more SEs, more preferably of all of the SEs, additionally comprises a test profile. The test profile is not an initial profile.

The test profile does not contain any user data and serves the purpose of simulating and testing the functionality of the SE, for example the identification/authentication. Thus, it is possible to ensure that the SE and the introduced operating system are functioning properly before an authentication/identification of the SE using the genuine profile data of the SE is performed. Any connection errors can then not be attributed to a faulty operating system or a faulty architecture of the SE; the error analysis is therefore simplified and accelerated.

Preferably, the test profile is executed, after the personalization of the secure element, in the then finished terminal in order to simulate a communications link to a mobile radio network. The simulation is used for checking whether a connection to the network with the SE would be possible.

Preferably, only in the case of a successfully simulated communications link is a SIM functionality of the SE enabled. In this case, the test profile of the SE is deactivated, and a (genuine) profile is activated.

Preferably, the data generator comprises a vSIM manufacturer (also referred to as eUICC manufacturer, "EUM" for short) or an SE manufacturer.

Preferably, the secure element is an iSE or an eSE which in each case is fixedly installed in the terminal and cannot be replaced easily.

Preferably, prior to the request for a bundle of memory maps being obtained, for each secure element an asymmetric cryptographic key pair is generated, wherein the private key part of the asymmetric cryptographic key pair remains permanently in the SE and the public key part of the asymmetric cryptographic key pair is sent into a hardware security module, HSM, of the data generator.

Preferably, the terminal manufacturer, once the memory map bundle has been obtained, removes the memory map for the secure element to be personalized from the memory map bundle and stores it in the secure element to be personalized.

The personalization for a multiplicity of SEs can be started in response to a request for personalization. For example, for this purpose in each case one identifier of the SE to be personalized is obtained, for example a unique identifier UID. Such a request is sent, for example, by a terminal manufacturer and in the process is physically provided to a personalization system used for the personalization, in particular a hardware security module, HSM, of such a personalization system which is used by the terminal manufacturer for personalization of the secure element.

In accordance with the invention, a batch comprising a multiplicity of SEs is personalized during batch operation by the data generator. The request for such a batch (bundle) then contains a plurality of identifiers of a plurality of SEs to be personalized, for example UIDs.

By way of summary, the invention provides a method for personalizing a multiplicity of SEs, wherein an SE is being fixedly installed in a corresponding terminal of a multiplicity of terminals.

Preferably, the personalization comprises the agreement of a shared secret between each SE and the data generator (for example the hardware security module, HSM, thereof), an encryption of the operating system with profile data (=subscription data set) in the HSM on the basis of the shared secret for generating personalized memory maps and transmission of a multiplicity of generated memory maps as a bundle to the requesting terminal manufacturer.

Further preferably, the operating system in the SE is newly encrypted (reencrypted) and then stored in an NVM of the terminal/of the chipset which is outside the secure element.

The communications network is preferably a mobile radio network.

The subject matter of the invention is accordingly the efficient personalization of a multiplicity of SEs with a SIM functionality. The SEs are in this case fixedly installed in terminals. The invention provides an environment in which a terminal manufacturer does not need to, and also furthermore should not, operate an SE management but nevertheless is guaranteed quick finishing of terminals. For this purpose, the terminal manufacturer or the chipset manufacturer generates a request for a bundle of memory maps, possibly with the issuing of indications relating to the respective chips, relating to the respective customers and possibly relating to the desired network operators (M(v) NOs). The data generator produces corresponding memory maps and obtains for this purpose directly profile data and operating system. For each data set, a BLOB is thus generated. The BLOBs are kept in block form in a database. The terminal manufacturer obtains the requested bundle of memory maps en bloc.

BRIEF DESCRIPTION OF THE FIGURES

The invention and further embodiments and advantages of the invention are explained in more detail below with reference to figures, wherein the figures merely describe exemplary embodiments of the invention. Identical parts in the figures are provided with the same reference symbols. The figures should not be considered as being true to scale; individual elements in the figures may be illustrated as being excessively large or excessively simplified.

DETAILED DESCRIPTION OF EXEMPLARY EMBODIMENTS

Figure 1:
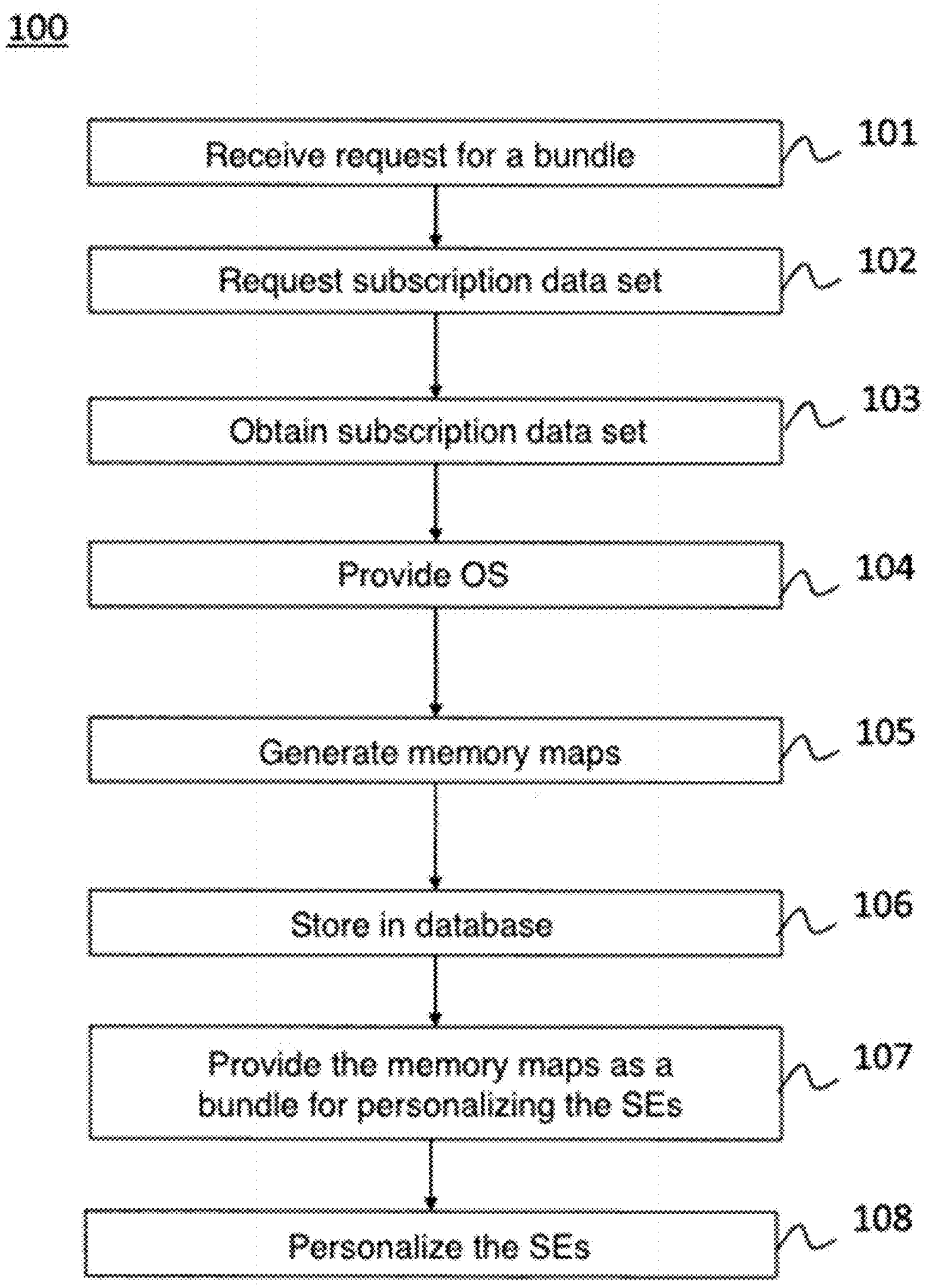
FIG. 1 shows an exemplary embodiment of a flow chart of a method according to the invention for personalizing SEs.
Figure 2:
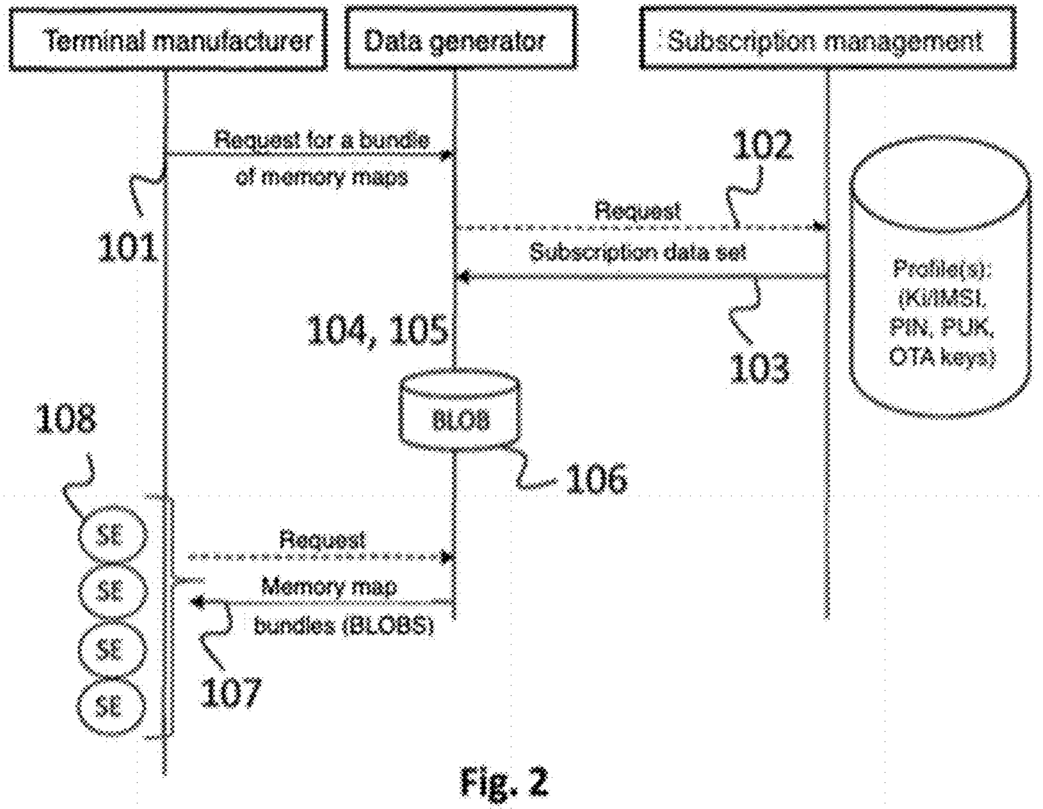
FIG. 2 shows an exemplary embodiment of a sequence diagram of the method according to the invention shown in FIG. 1.

FIG. 1 shows an exemplary embodiment of a flow chart of a method according to the invention for personalizing an SE. FIG. 2 shows an exemplary embodiment of a sequence diagram of the method according to the invention shown in FIG. 1. FIGS. 1 and 2 are described together below.

In step 101, a request for a bundle of memory maps is received in a data generator by a terminal manufacturer. This request relates to an SE of a multiplicity of SEs. In each case one SE of the multiplicity of SEs is fixedly installed in a corresponding terminal of a multiplicity of terminals or is being fixedly installed there. The request could also be referred to as a data set request bundle.

In the optional subsequent step 102, a subscription data set is requested at a subscription management server, in this case an SM-DP+.

Figure 10:
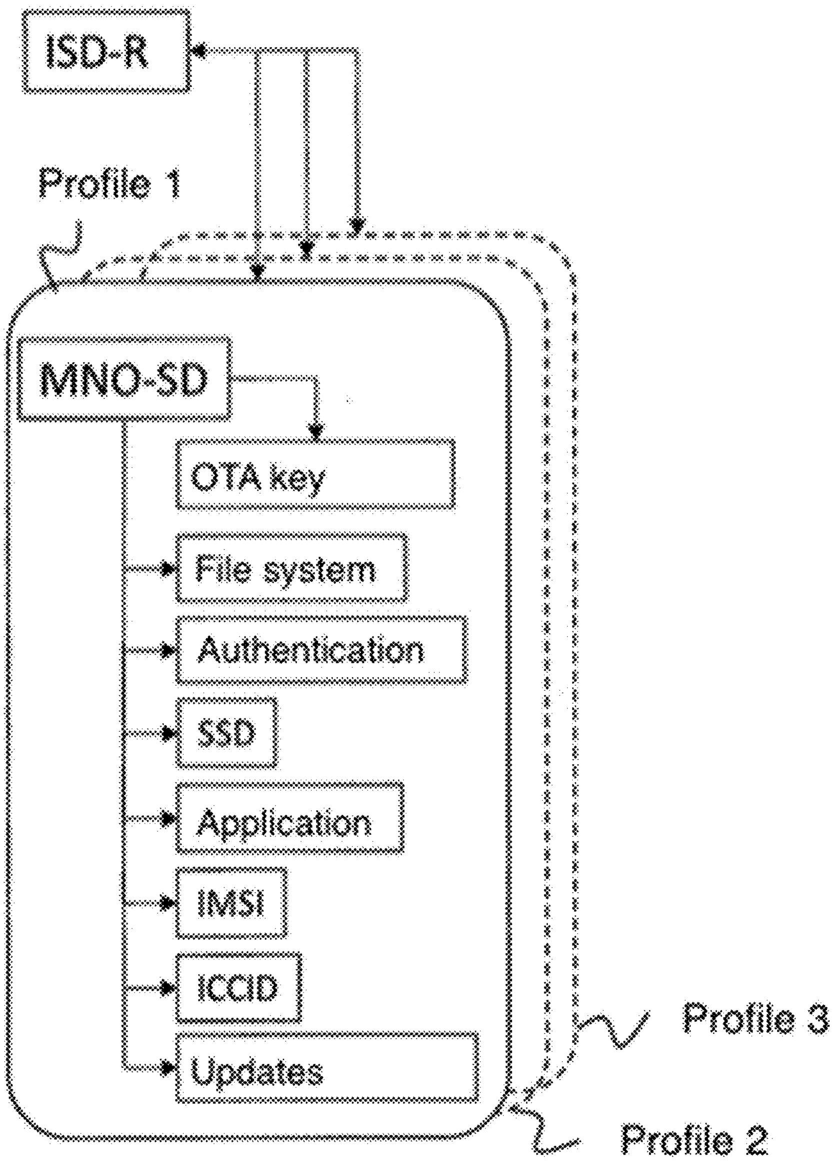
FIG. 10 shows a schematic illustration of a setup of profile data for an SE in accordance with the invention.

In step 103, at least one subscription data set is obtained in the data generator for at least one secure element to be personalized of the multiplicity of secure elements. The subscription data set is obtained by the SM-DP+. The subscription data set is configured to authenticate and/or identify a user on a communications network (=SIM functionality). The subscription data set comprises, for example, an IMSI, an authentication key Ki, a PIN/PUK combination and OTA keys. The structure of a subscription data set (=profile) is illustrated in FIG. 10.

In step 104, an operating system or part of the operating system is provided for the secure element to be personalized by the data generator.

In step 105, the data generator generates a memory map 10 for each of the secure elements in accordance with the request from step 101. The memory maps 10, also referred to as BLOBs, contain, for a secure element to be personalized, an operating system or part of the operating system and additionally an obtained subscription data set. Furthermore, the memory map 10 can comprise a test profile 7.

In the subsequent step 106, the generated memory maps 10 are stored in a database of the data generator. The structure of a BLOB 10 is shown, for example, in FIG. 7.

In step 107, the generated memory maps 10 are bundled and the bundled memory maps are provided as a memory map bundle by the data generator.

In step 108, the SE is personalized whilst introducing at least the memory map 10 of the secure element to be personalized.

If the memory map 10 contains a test profile 7, this is executed after the personalization of the secure element in step 108 in the then finished terminal 1 in order to simulate a communications link with a mobile radio network. Only after successful execution of the test profile 7 is the SIM functionality of the secure element effectively enabled. In this case, the test profile 7 of the SE is deactivated, and a (genuine) profile is activated. Then, the terminal 1 is passed on to a user. Said user can use the terminal 1 directly and produce a communications link with a mobile radio network by means of the activated profile.

Figure 3:
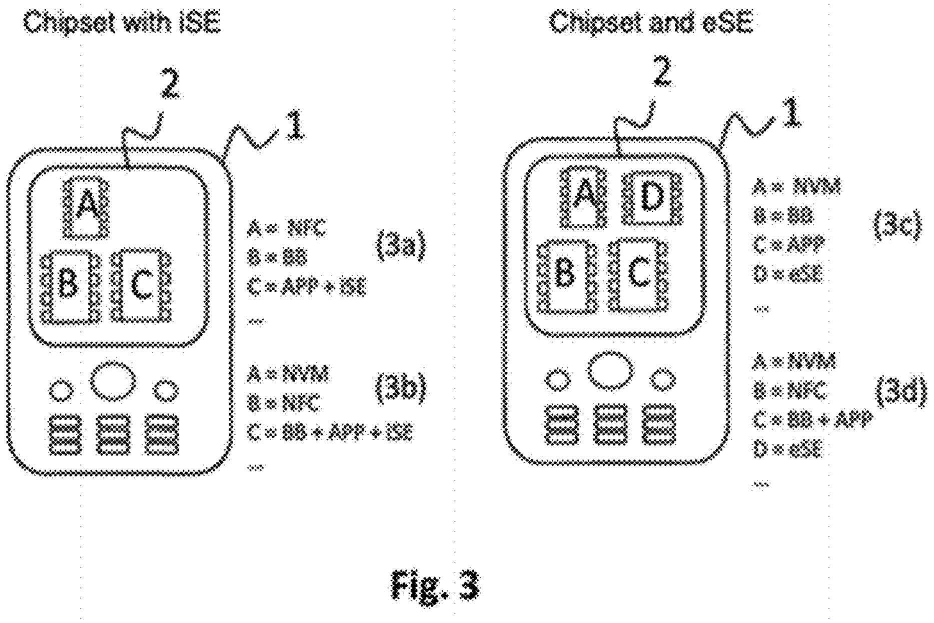
FIG. 3 shows a schematic illustration of four exemplary configurations of a chipset and a secure element in a terminal, suitable for the method in accordance with the invention.

FIG. 3 shows a schematic illustration of four exemplary configurations of a chipset 2 and an SE in a terminal 1, suitable for the method in accordance with the invention.

In accordance with FIG. 3(*a*), the chipset 2 comprises an NFC chip A (NFC=near field communication), a baseband processor chip B and a chip C on which an application processor APP and an integrated secure element iSE are integrated. Further chips can be provided in the chipset 2 in FIG. 3(*a*).

In accordance with FIG. 3(*b*), the chipset 2 comprises an NVM chip A on which a nonvolatile memory NVM is integrated which is assigned to an integrated secure element iSE (see below), an NFC chip B and a chip C on which a baseband processor BB, an application processor APP and an integrated secure element iSE are integrated. Further chips can be provided in the chipset 2 in FIG. 3(*b*).

In accordance with FIG. 3(*c*), the chipset 2 comprises an NVM chip A on which a nonvolatile memory NVM is integrated which is assigned to an embedded secure element eSE (see below), a baseband processor chip B and an application processor chip C. In addition to the chipset 2 of the terminal 1, an embedded secure element eSE is provided on a chip D in the terminal 1. Further chips can be provided in the chipset 2 in FIG. 3(*c*).

In accordance with FIG. 3(*d*), the chipset comprises an NVM chip A on which a nonvolatile memory NVM is integrated which is assigned to an embedded secure element eSE (see below), an NFC chip B and a chip C on which a baseband processor BB and an application processor APP are provided. In addition to the chipset 2 of the terminal 1, an embedded secure element eSE is provided on a chip D in the terminal 1. Further chips can be provided in the chipset 2 in FIG. 3(*d*).

Figure 4:
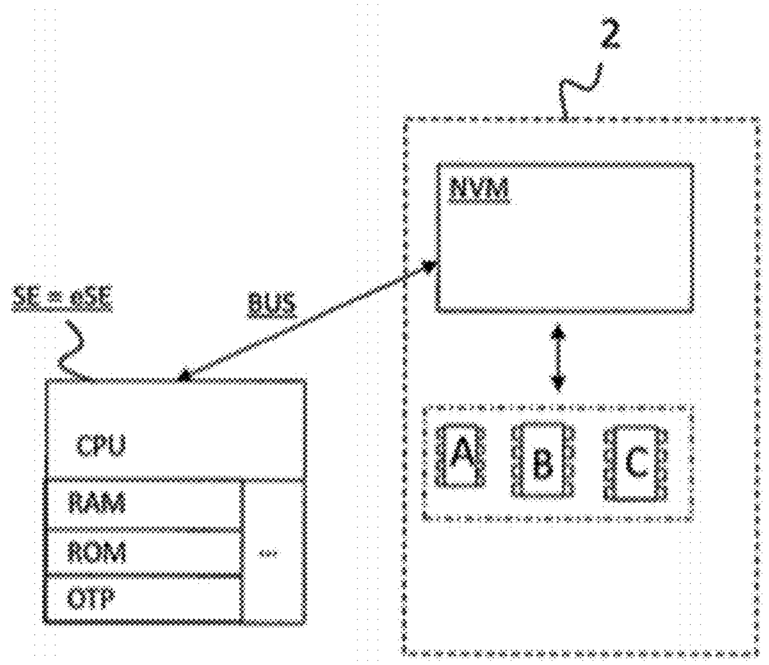
FIG. 4 shows a schematic illustration of an exemplary configuration of a chipset and an eSE in a terminal, suitable for the method in accordance with the invention.

FIG. 4 shows a schematic illustration of an exemplary configuration of a chipset 2 and an eSE in a terminal 1, suitable for the method in accordance with the invention. The embedded secure element eSE comprises a secure processor with a control unit CPU, an internal random-access memory (volatile memory) RAM, an internal permanent read-only memory ROM and a one-time programmable permanent memory OTP.

The storage capacity of the internal permanent read-only memory ROM and the one-time programmable permanent memory OTP of the embedded secure element eSE is only very small. Therefore, a nonvolatile memory NVM which is assigned to the embedded secure element eSE and can be used for this eSE is provided in the chipset 2 of the terminal 1. Further elements of the chipset 2 of the terminal 1 such as application processor A, baseband processor (modem) B and NFC module C are merely indicated in FIG. 4.

Figure 5:
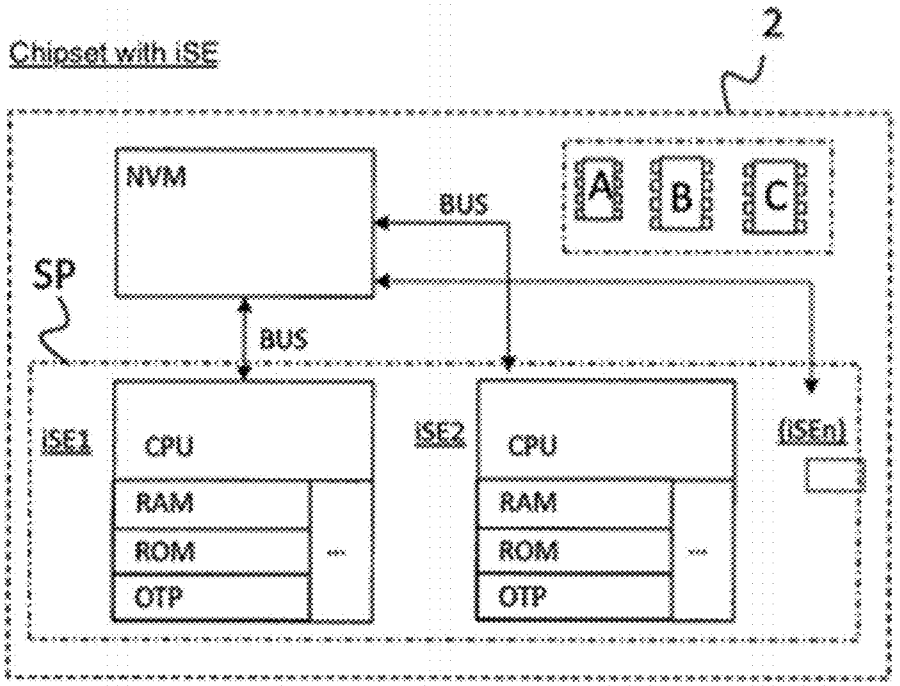
FIG. 5 shows a schematic illustration of an exemplary configuration of a chipset and two iSEs in a terminal, suitable for the method in accordance with the invention.

FIG. 5 shows a schematic illustration of an exemplary configuration of a chipset 2 and two iSEs in a terminal 1, suitable for the method in accordance with the invention. The internal design of each integrated secure element iSE1, iSE2 with CPU, RAM, ROM, OTP is substantially the same as the embedded secure element eSE shown in FIG. 4.

In contrast to embedded secure elements eSEs, integrated secure elements iSE1, iSE2 are integrated directly in a chipset 12 of the terminal 1. A nonvolatile memory NVM which is assigned to the integrated secure elements iSE1, iSE2 and can be used therefor and which has, for each of the two integrated secure elements iSE1, iSE2, a dedicated memory area which is only accessible to the respective iSE is provided in the chipset 2 of the terminal 1 in FIG. 5. Alternatively (not illustrated), for each of the integrated secure elements iSE1, iSE2, a dedicated assigned nonvolatile memory NVM which can be used for said secure element can be provided. Further elements of the chipset 2 of the terminal 1 such as application processor A, baseband processor (modem) B and NFC module C are merely indicated in FIG. 5.

Figure 6:
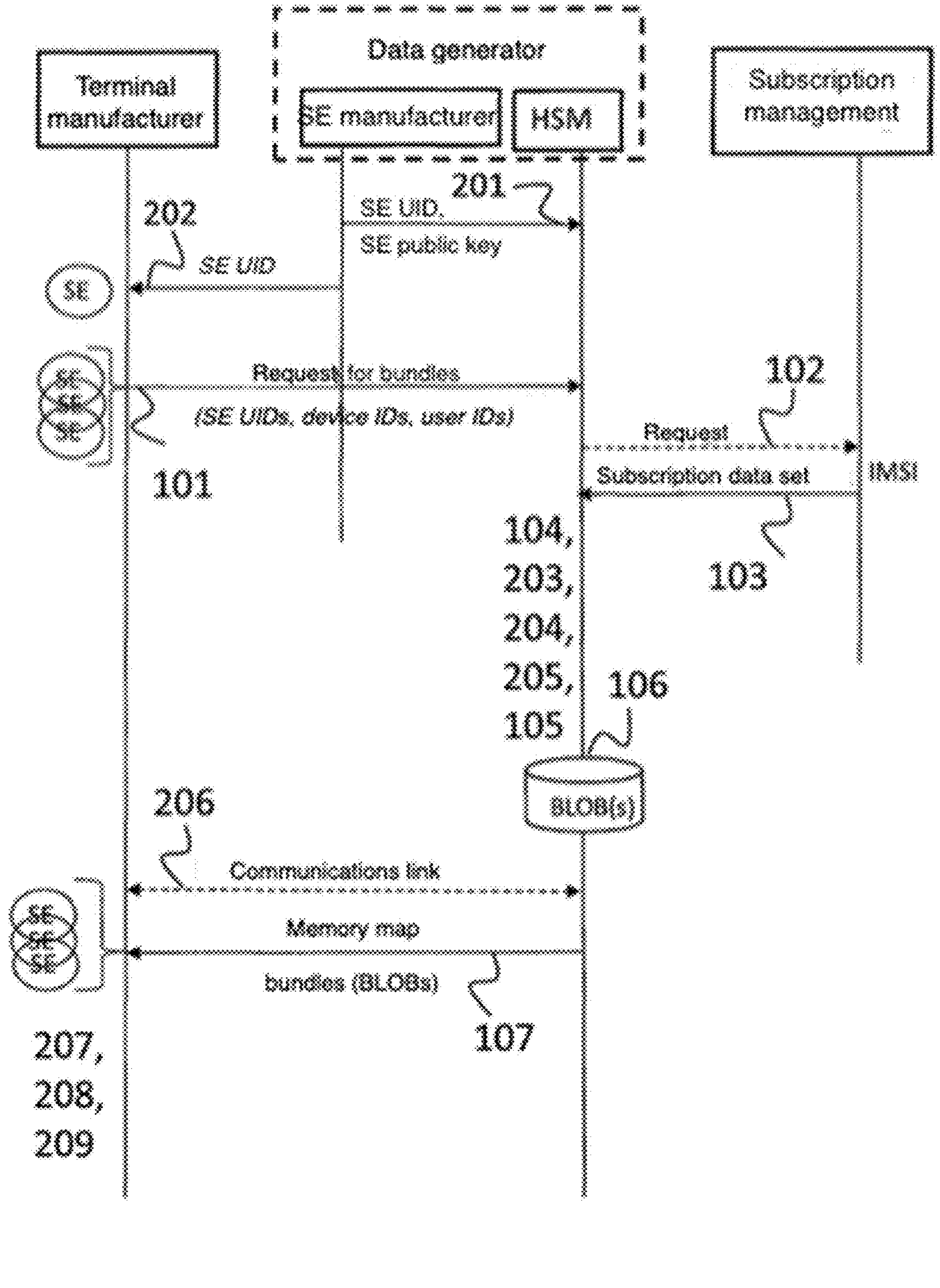
FIG. 6 shows a development of the sequence diagram of the method according to the invention shown in FIG. 2.

FIG. 6 shows a development of the sequence diagram of the method according to the invention in accordance with FIG. 2. Reference is made here to that which has been stated in relation to FIGS. 1 and 2 (above) so as to avoid repetition and only the additional elements are described below.

The development of the method now also comprises the following steps:

Step 201: providing an SE by means of an SE manufacturer as part of the data generator. In addition, an asymmetric SE key pair assigned to the SE can be generated which comprises a private SE key and a public SE key. The private SE key does not leave the SE. In addition, an identifier SE UID of the SE, for example of the ETSI unique identifier UID, can be sent as an item of SE information to a hardware security module HSM of the data generator.

In addition, the public SE key can be sent to the hardware security module HSM of the data generator. The sending of the public SE key can take place via a plurality of stations. For example, the public SE key is first sent from the secure element SE to a server of the SE manufacturer (as part of the data generator) and then sent from this server of the SE manufacturer into the HSM (as part of the data generator). This form of key distribution corresponds to a concept of the SE-internal key derivation, also referred to as on-board (in the SE) key derivation or on-board key generation.

In the case of an alternative concept for key distribution, also referred to as key injection, the asymmetric SE key pair assigned to the SE is generated or/and derived in the HSM. The public SE key is later used by the HSM itself or by another HSM, and the private SE key is sent from the hardware security module HSM to the SE, or in other words is injected into the SE from the HSM. Then, the private SE key no longer leaves the SE.

The HSM can then be provided, for example, to a manufacturer of operating systems. This can optionally take place by virtue of the HSM physically being provided to the manufacturer of operating systems. Alternatively and preferably, the operating systems are provided by the data generator itself. For this purpose, the HSM remains physically at the SE manufacturer and the operating system provision instance of the data generator (not illustrated explicitly in FIG. 6) obtains access to the HSM via data link.

Less preferably, it is also possible for keys to be sent from one HSM to another HSM via a secure mechanism so that a plurality of HSMs is used in the personalization process.

Step 201 is repeated for the multiplicity of SEs.

Step 202: providing the SE to the terminal manufacturer and fixedly installing the SE in a terminal 1. At any one point in time the remaining components of the conventional chipset 2 of the terminal 1 and a nonvolatile memory NVM specific to the SE are or have been installed in the terminal 1 (see FIGS. 3 to 5). The SE can optionally be provided to the terminal manufacturer as a dedicated component. Alternatively, the SE is first provided to a chipset manufacturer (not illustrated explicitly) and installed in the chipset 2 by said chipset manufacturer. The chipset manufacturer then provides the chipset 2 with the SE to the terminal manufacturer. In accordance with one alternative, the SE is fully integrated on an individual chip or SoC by means of production engineering as partial structure on the chip surface of the chipset. In this case, the chipset manufacturer provides the chipset including the SE to the terminal manufacturer. The partial structure of the SE can in this case be manufactured at the request of the SE manufacturer. Alternatively, the chipset manufacturer is at the same time the SE manufacturer.

Step 202 is repeated for the multiplicity of SEs.

The multiplicity of terminals 1 at the terminal manufacturer are now ready for personalization of the Ses located therein by virtue of loading an operating system and a subscription data set or profile data in any combination of terminal 1 and SE for the multiplicity of terminals 1.

The terminal manufacturer has access to the HSM of the data generator in which the public SE key of the SE to be personalized is contained. This can be provided, for this purpose, to the HSM physically at the terminal manufacturer or the terminal manufacturer is connected to the HSM by a remote data link (not explicitly shown in FIG. 6).

Step 101 corresponds to step 101 from FIGS. 1 and 2. The following will be added. In order to initiate the personalization of the Ses, the operating system provision instance of the data generator for the Ses can pass on the request from step 101 to the HSM. Then, preferably identifiers of the Ses to be personalized, for example the unique identifiers UID of the Ses, are contained in the request, as well as, if required, an indication (=items of terminal information) of the respective multiplicity of terminals of the terminal manufacturer. This request for a bundle of Ses instead of an individual order for each individual SE is advantageous for the above-mentioned reasons.

Steps 102 to 105 correspond to steps 102 to 105 in FIGS. 1 and 2. If appropriate, reference will once again be made here specifically thereto.

Step 203: In the HSM, generation or provision of an asymmetric HSM key pair which comprises a public HSM key and a private HSM key takes place. This step 203 can also already have taken place in the HSM before the request in accordance with step 101 for personalization has been received in the HSM.

Step 203 is repeated for each of the multiplicity of Ses.

Only in response to the reception of the request in accordance with step 101 does step 204 take place, on the other hand. In the HSM, starting from the private HSM key and the public SE key, a derivation of a secret which is shared with one of the multiplicity of Ses and is in the form of at least one symmetrical key takes place. Optionally, the shared secret comprises a symmetrical key, but preferably two symmetrical keys. One or the first key is a transport key (the transport key is an encryption key) or such a transport key is derived from the one/first key. The second key is an authentication key, or an authentication key is derived from the second key.

Step 204 is repeated for each of the multiplicity of SEs.

Step 205: In the HSM, an operating system packet is provided for one of the SEs. The operating system packet comprises the operating system OS provided in accordance with step 104 for the respective SE and the profile data (=subscription data set) for the respective SE in accordance with steps 102 and 103. Optionally, in addition already one or more applications for the respective SE can be provided in the operating system packet which are later intended to be executable in the respective SE. Optionally, in addition a checksum, for example a message authentication code MAC, is added to the operating system packet.

The operating system packet is encrypted with the previously derived transport key in order to generate an encrypted operating system packet.

Step 205 is repeated for each of the multiplicity of SEs.

After the encryption of the operating system packet, step 105 in accordance with FIGS. 1 and 2 takes place: In the HSM, a memory map BLOB which is suitable for programming a respective SE is generated per SE. The memory map BLOB comprises at least the encrypted operating system packet and the public HSM key and, if present, the checksum, for example the message authentication code MAC.

Step 105 is repeated for each of the multiplicity of SEs in order to obtain the memory map bundle.

Step 206: setting up and operating a data link between the HSM and the terminal manufacturer whilst sending the memory map bundle from the HSM to the terminal manufacturer. Alternatively or in addition, the data link can send the memory maps BLOB live to the SE fixedly installed in the respective terminal 1 of the multiplicity of terminals 1 so that each of the memory maps BLOB from the memory map bundle is received directly in the respective SE.

Once the corresponding memory image BLOB has been received in the respective SE, in step 207 in the SE the public HSM key is extracted from the memory image BLOB starting from the private SE key and the public HSM key. Then, derivation of the shared secret and the transport key and decryption of the encrypted operating system packet by means of the transport key take place.

Step 207 is repeated for each of the multiplicity of SEs.

Step 208: In the SE, provision, generation or derivation of a symmetrical NVM encryption key which is individual to the SE and is different than the transport key takes place. Then, (re)encryption of the decrypted operating system packet with the NVM encryption key takes place.

Step 208 is repeated for each of the multiplicity of SEs.

After the encryption of each decrypted operating system packet with the NVM encryption key, step 209 takes place: In the SE, storage of the decrypted and reencrypted, with the individual symmetrical NVM encryption key, operating system packet takes place in a nonvolatile memory NVM assigned to the SE of the respective terminal 1 (externally from the SE or internal NVM of the SE). In this case, by storage of the operating system packet in the nonvolatile memory NVM, the SE is equipped with an operating system which can be executed in the SE and which has already been personalized with the subscription data set (=profile data) and to which the one or more applications which are likewise provided in the operating system packet are already available, if appropriate.

Figure 7:
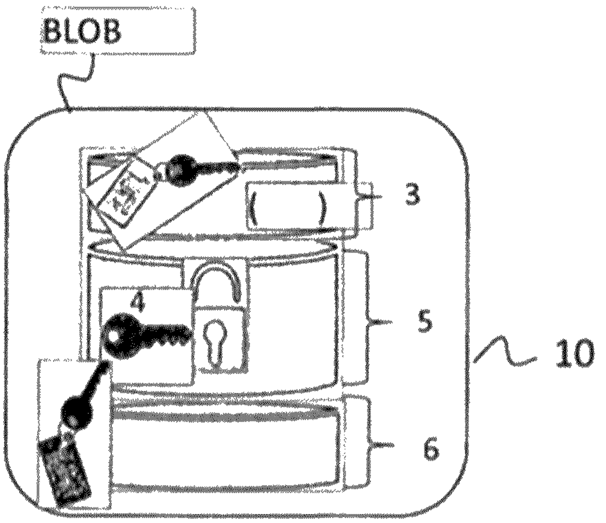
FIG. 7 shows a memory map, in accordance with one embodiment of the invention.

FIG. 7 shows a memory map or a BLOB 10. The BLOB 10 comprises an operating system OS and a profile (subscription data set) with the personalization data. The generation, structure and use of a memory map BLOB 10 with the interaction of the operating system provision instance of the data generator will be explained with reference to FIG. 7.

Section 3 of the BLOB: The operating system provision instance of the data generator generates, in the HSM, a BLOB-individual public ECC key, which is used as the basis for an ECIES (elliptic curve integrated encryption scheme) method.

Section 4 of the BLOB shows a chip-individual BLOB encryption key (in accordance with the AES128 algorithm): This key 4 is used for encrypting/decrypting the BLOB data. The key 4 is not sent in the BLOB 10. This key is the output of the ECIES. During a calculation in the SE, the following applies: The input is the SE-individual private ECC key (private SE key) and the BLOB-individual public ECC key. The output is the shared secret KDF=BLOB encryption key. A MAC key is also generated by ECIES.

Section 5 of the BLOB 10 shows the actual BLOB data which consists of the program code of the operating system (or part of the operating system) and the program code of the profile data. This section 5 is sent in encrypted form with the chip-individual BLOB encryption key. This encrypted segment should also be MAC-activated.

Section 6 of the BLOB shows a signature over the BLOB. The signature is generated by an operating system provision instance signature key of the data generator over the BLOB data from section 5 of the BLOB. The signature itself is encrypted by the chip-individual BLOB encryption key, however.

The operating system provision instance signature verification key is integrated in an adapted version of the bootloader, and the signature is verified during the loading of the BLOB into the iSE or the associated NVM.

Figure 8:
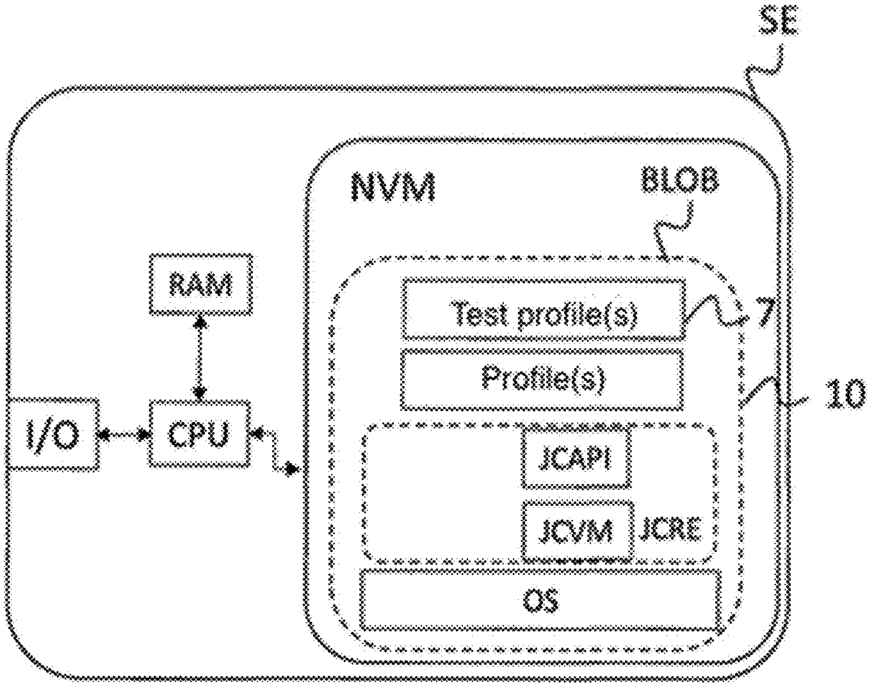
FIG. 8 shows a schematic illustration of an exemplary configuration of an SE with JCRE in accordance with the invention.

FIG. 8 shows a block circuit diagram of an SE. The SE has an operating system OS. The operating system OS is, for example, a native operating system. The operating system OS can be configured to operate a Java Card runtime environment, JCRE, with corresponding programming interface(s) JCAPI. In addition, profile data and a test profile 7 are shown. OS, JCRE, JCAPI, profiles and test profile 7 represent, as indicated by the border, a memory map or a BLOB 10 which has been introduced into the NVM of the SE (or the NVM assigned to the SE) in accordance with the personalization of an SE.

Figure 9:
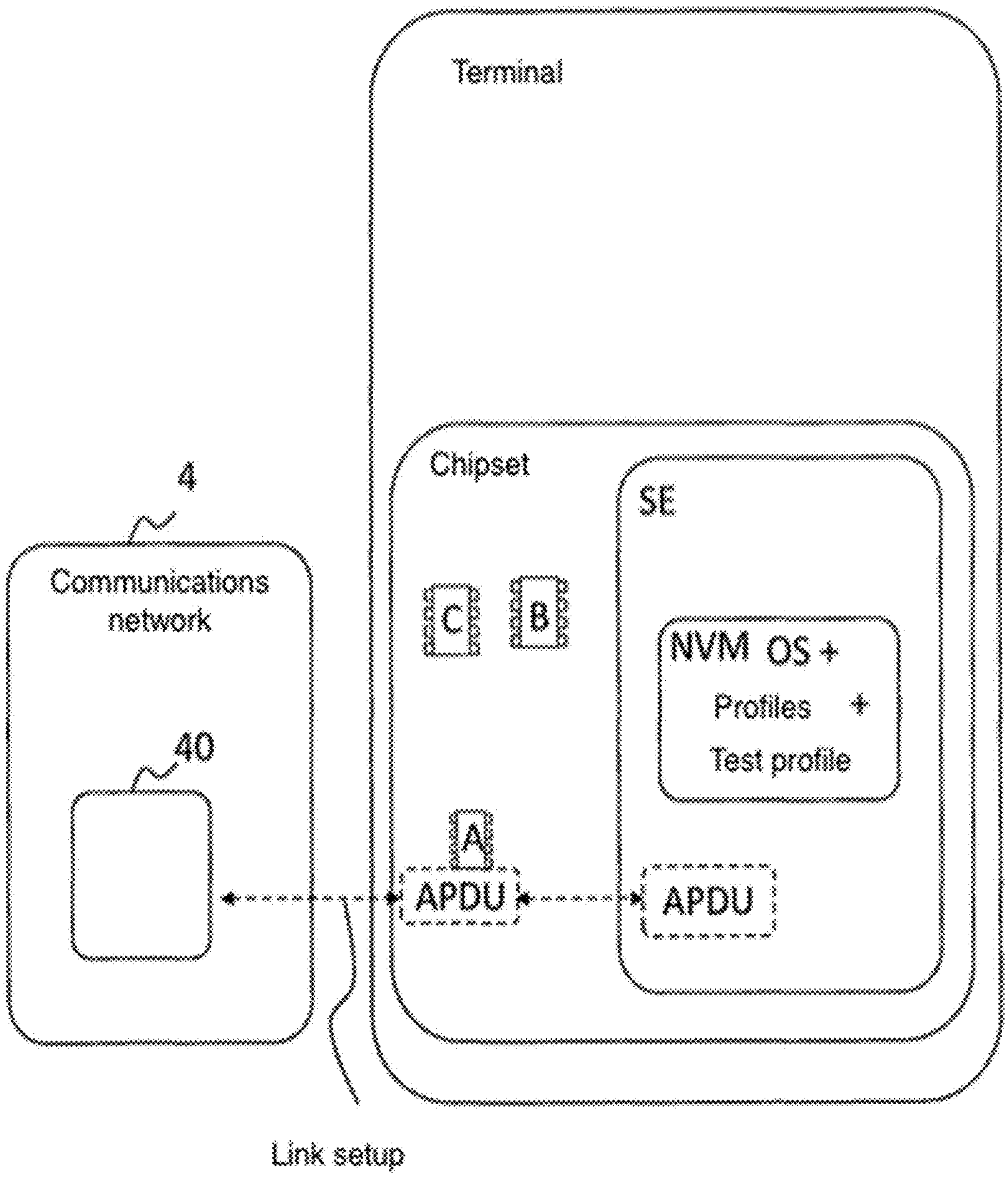
FIG. 9 shows a schematic illustration of an exemplary configuration of a setup of a link between SE and a communications network in accordance with the invention.

The SE is configured in the operationally ready state, i.e. in the personalized state, to exchange data with the device 2 shown in FIG. 9. For data transmission or communication between the SE and the terminal 1, both the SE and the terminal 1 each have suitable communications interfaces.

In addition, the SE has the CPU already described above. The execution of arithmetic and logic functions and the reading and writing of data elements as this is defined by program code executed by the CPU are among the primary tasks of the CPU. In addition, the CPU is connected to a volatile random-access memory, RAM, a permanent memory ROM and a nonvolatile rewritable memory NVM. Preferably, the nonvolatile memory NVM is a flash memory (flash EEPROM). This may be, for example, a flash memory with a NAND or a NOR architecture.

In the embodiment illustrated in FIG. 9, the program code which can be executed by the CPU (FIGS. 4, 5 and 8) is stored in the nonvolatile memory NVM. In particular, the program code of the chip card operating system, OS, the Java Card runtime environment, JCRE, (consisting of Java Card virtual machine, JCVM, and Java Card application programming interfaces, JCAPI) and applications can be stored in the nonvolatile memory NVM. In this case, the applications are preferably present in the form of Java Card™ Applets.

FIG. 9 shows an exemplary embodiment of a system comprising terminal 1 and SE. The terminal 1 is, for example, an M2M device in an IoT environment. The SE is fixedly installed in the terminal 1 in operationally ready form. The chipset 2 of the terminal 1 also comprises, in addition to the SE, further chips A, B, C, see explanations relating to FIGS. 3 to 5. By way of example, chip A is the modem. The entire data exchange between the SE and the terminal 1 preferably takes place using the so-called APDUs (application protocol data units) in accordance with the standard ISO/IEC 7816-4. An APDU represents a data unit of the application layer, i.e. a type of container with which commands and/or data are sent to the eUICC 1. A communications unit of the chipset 2 is configured to exchange data of the terminal 2 or the SE via a communications network 4.

FIG. 10 shows an example of a profile 1 (and suggestively of a profile 2 and a profile 3), how it can be provided by the server to the data generator in step 103. The profile 1 can comprise an OTA key, a file system, an authentication, a security subrange, applications, an IMSI, an ICCID and possibly updates.

Within the scope of the invention, all of the described and/or illustrated and/or claimed elements can be combined with one another in any desired manner.

The invention claimed is:

1. A method for personalizing a secure element having the following method steps:

receiving, in a data generator, a request for a bundle of memory maps for a multiplicity of secure elements, wherein each requested memory map of the received bundle relates to a secure element of the multiplicity of secure elements, and wherein in each case one secure element of the multiplicity of secure elements is being or is fixedly installed in a corresponding terminal of a multiplicity of terminals;

obtaining, in the data generator, at least one subscription data set for at least one secure element to be personalized of the multiplicity of secure elements, wherein the data generator directly requests the subscription data set from a subscription management server and directly receives the subscription data set from the subscription management server;

providing, by means of the data generator, an operating system or part of the operating system for the secure element to be personalized;

generating, by means of the data generator, a memory map for each of the multiplicity of secure elements in accordance with the received request, wherein at least a generated memory map of the secure element to be personalized comprises a test profile, the provided operating system or the part of the operating system and additionally the obtained at least one subscription data set; and bundling the generated memory maps and providing the bundled memory maps as a memory map bundle by means of the data generator for finishing the terminals whilst introducing at least the memory map of the secure element to be personalized into the secure element for personalizing the secure element, wherein the test profile is executed, after a terminal is finished through personalization of the secure element, in the then finished terminal in order to simulate a communications link to a mobile radio network, wherein only when a successfully simulated communications link is established is a Subscriber Identity Module (SIM) functionality of the secure element enabled.

2. The method according to claim 1, wherein the request for the bundle of memory maps comprises, for each requested memory map, one or more of:

an item of terminal information relating to a terminal in which a secure element relating to one of the requested memory maps is being fixedly installed, an item of secure element information relating to one of the multiplicity of secure elements relating to one of the requested memory maps, an item of user information relating to a user of a terminal in which a secure element relating to one of the requested memory maps is being fixedly installed, and a public key part of a cryptographic key pair of the secure element relating to one of the requested memory maps.

3. The method according to claim 2, wherein the obtained subscription data set is based on said one or more of the item of terminal information, the item of secure element information, the item of user information, and the public key part and is obtained at the request of the data generator.

4. The method according to claim 2, wherein when the request for the bundle of memory maps comprises the item of terminal information and/or the item of secure element information, one or more of the item of terminal information and the item of secure element information is an item of chipset information for a chipset which comprises the secure element.

5. The method according to claim 1, wherein, in the obtaining step, the data generator obtains at least one subscription data set for at least two or more of the secure elements of the multiplicity of secure elements from the subscription management server.

6. The method according to claim 1, wherein, in the providing step, an operating system or part of the operating system is provided for at least two or more, for all of the secure elements of the multiplicity of secure elements.

7. The method according to claim 1, wherein the request for the bundle of memory maps is sent by a terminal manufacturer or a chipset manufacturer.

8. The method according to claim 1, wherein the memory map bundle of the generated memory maps is provided in a database and is called up by a terminal manufacturer for finishing the multiplicity of terminals, wherein the callup from the database is cryptographically secure.

9. The method according to claim 1, wherein the data generator is physically removed from the subscription management server and/or the terminal manufacturer.

10. The method according to claim 1, wherein the data generator is a vSIM manufacturer or an SE manufacturer, and wherein the secure element is an integrated secure element or an embedded secure element.

11. The method according to claim 1, wherein, prior to the request for a bundle of memory maps being obtained, for each secure element an asymmetric cryptographic key pair is generated, wherein the private key part of the asymmetric cryptographic key pair remains permanently in the secure element and the public key part of the asymmetric cryptographic key pair is sent into a hardware security module of the data generator.

12. The method according to claim 1, wherein the terminal manufacturer, once the memory map bundle has been obtained, removes the memory map for the secure element to be personalized from the memory map bundle and stores it in the secure element to be personalized.

13. The method according to claim 1, wherein the generated memory map of two or more secure elements to be personalized additionally comprises a test profile.

14. The method according to claim 1, wherein the generated memory map of all of the secure elements to be personalized additionally comprises a test profile.

15. The method according to claim 1, wherein the subscription data is only created on request.

16. The method according to claim 1, wherein the subscription management server is an Subscription Manager Data Preparation (SM-DP) or Subscription Manager Data Preparation Plus (SM-DP+).

* * * * *